US004001766B2

United States Statutory Invention Registration [19]

[11] Reg. Number: H1766

Horton

[45] Published: Jan. 5, 1999

[54] INTEGRATED ASTRAGAL

[75] Inventor: Craig Horton, Ventura, Calif.

[73] Assignee: The United States of America as represented by the Secretary of the Navy, Washington, D.C.

[21] Appl. No.: 819,695

[22] Filed: Mar. 18, 1997

Related U.S. Application Data

[63] Continuation-in-part of Ser. No. 394,110, Feb. 17, 1995, abandoned.

[51] Int. Cl.[6] ..... E05B 63/12

[52] U.S. Cl. ..... 70/131

[58] Field of Search ..... 70/104, 416–418, 70/131, 102, 448; 292/346

[56] References Cited

U.S. PATENT DOCUMENTS

| | | | |
|---|---|---|---|
| 1,280,993 | 10/1918 | Hammer . | |
| 1,462,828 | 7/1923 | Rixson | 70/104 |
| 1,538,283 | 5/1925 | Gertsfeld | 70/104 |
| 1,687,388 | 10/1928 | Rigo | 70/418 |
| 1,744,988 | 1/1930 | Shaw | 70/104 |
| 3,405,962 | 10/1968 | Sushan | 292/346 |
| 3,761,119 | 9/1973 | Bennett | 292/346 |
| 4,157,653 | 6/1979 | Dohanyos | 70/417 |
| 4,548,062 | 10/1985 | Kaufman | 70/417 |
| 4,688,409 | 8/1987 | Oliver et al. | 70/417 |
| 4,690,441 | 9/1987 | Fazzolari | 70/417 |
| 4,918,953 | 4/1990 | Newman | 70/102 |
| 5,406,814 | 4/1995 | Zeager et al. | 70/102 |
| 5,547,239 | 8/1996 | Allenbaugh | 70/416 |
| 5,584,517 | 12/1996 | Simnacher | 292/346 |
| 5,586,796 | 12/1996 | Fraser | 70/416 |

FOREIGN PATENT DOCUMENTS

| | | | |
|---|---|---|---|
| 352418 | 4/1922 | Germany | 70/104 |

*Primary Examiner*—Charles T. Jordan
*Assistant Examiner*—Meena Chelliah
*Attorney, Agent, or Firm*—Melvin J. Sliwka; David S. Kalmbaugh

[57] ABSTRACT

An apparatus for reducing the vulnerability to unauthorized entry past a door comprising a first rectangular shaped plate attached to the outside of the door, the first plate having a second or strike plate positioned to extend into the door frame to resist separation of the door and its door frame when the door is closed. The apparatus further comprises a third rectangular shaped plate attached to the inside of the door and communicating with the first plate. A portion of the first plate extends beyond the door covering a portion of the door frame. The apparatus is adapted to receive a door locking mechanism having a dead bolt. When the door is in a closed position and the dead bolt is activated, the dead bolt is extended through a pair of apertures in the door frame. Extending the dead bolt through the pair of apertures in the door frame reinforces the door and door frame and places all applied loads during forced entry directly to the dead bolt via double shear.

17 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTEGRATED ASTRAGAL

This application is a continuation-in-part of U.S. patent application Ser. No. 08/394,110, filed Feb. 17, 1995, abandoned on Mar. 18, 1997.

BACKGROUND OF THE INVENTION

1. Field of the Invention

The present invention relates to locks and lock mechanisms for securing a door, usually of the pivoting type, to a door frame. More specifically, the present invention relates to a door locking apparatus which may easily be retro-fitted to an existing door, its associated lock mechanism and a door frame or fitted anew to increase the effort and time required to gain unauthorized entry past the door.

2. Description of the Prior Art

In the past, one of the easiest and most commonly used techniques to gain entry past a locked door having a bolt and its associated door frame was to forcibly separate the door and the door frame in the vicinity of the lock mechanism by, for example, a crow bar or similar type pry bar. Once separated, the lock mechanism's bolt no longer engages the door frame's bore and the door may be opened.

The military requires a secure door to prevent access to restricted areas. Compromising these areas to attempted break-ins by terrorist or other individuals trying to gain access could be disastrous to the military as well as the civilian population within the vicinity of the restricted area.

In the past, numerous attempts have been made to provide a door locking device which secures a door to its door frame. U.S. Pat. No. 1,280,993 to Issac Hammer, which issued Oct. 8, 1918 discloses a locking device comprising a striking portion having rectangular recesses therein with the recesses opening toward the door to which the lock is attached. The locking device also includes a striker plate, for attachment to the frame, which has a plurality of rectangular shackles extending from the striker plate to enter the recesses. The shackles also have perforations extending therethrough with the perforations being adapted to align with the recesses in the sides of the striking portion of the lock when the lock is closed on the striker plate. There are provided a plurality of bolts slidably mounted in the perforations for extension therethrough. There is also provided means for moving the bolts through the perforations and for withdrawing the same therefrom with the means embodying a rotary device having a thrust member operatively engaging the bolts.

A second example of a prior art device for securing a door to a door frame is disclosed in U.S. Pat. No. 5,406,814 to Micheal Zeager et al. which issued Apr. 18, 1995. This patent discloses a latch guarded door lock and frame system having a recessed surface which is provided in a hollow metal frame, and is dimensioned to accommodate a latch guard so that the external surfaces of the door, frame and latch guard are flush. The recessed surface of the frame behind the latch guard is further reinforced by employing a thicker wall than is used in the rest of the frame, and by welding a square metal tube into the recessed region. A medial metal support is also welded into the lock box cavity in order to prevent the lock box from collapsing under stress.

While these and similar door locking mechanisms of the past are generally satisfactory in private sector applications such as for use in a residence or a commercial business, the military has a need for door locking mechanism which will provide far greater security and which is relatively inexpensive to manufacture. More specifically, the military has a need for a door locking mechanism which is adapted for use with the dead bolt of commercially available dead bolt locks and which provides (1) resistance to door frame separation and (2) places the dead bolt into double shear. The military also has a need for a door locking mechanism which is completely resistant to forced entry for a time period of at least one minute.

SUMMARY OF THE INVENTION

The purpose of the present invention is to provide a locking apparatus for securing a door to its associated door frame which may be easily retro-fitted to doors with existing dead bolt locks or fitted anew. The preferred embodiment of the present invention comprises a first generally rectangular shaped plate attached to and abutting the outside face of a door. A portion of the first plate extends outwardly from the end of the door and abuts a portion of the door frame for the door when the door is in the closed position. A second or strike plate, having an aperture, is attached at approximately 90 degrees to the first plate and extends into the door frame, via a first aperture within the door frame, when the door is in the closed position. The second plate is positioned so that the sliding or dead bolt of a locking mechanism will engage the aperture in the second plate when the sliding bolt is in the locked position. A third plate is attached to and abuts the inside face of the door and is in alignment with the first plate. The first plate and the second plate resist forced separation of the door from its frame when the sliding bolt engages the aperture in the second plate. In addition, the sliding or dead bolt is aligned with, extends into and engages second and third apertures in the door frame placing the sliding bolt in double shear. Extending the dead bolt through the pair of apertures in the door frame reinforces the door and door frame and places all applied loads during forced entry directly to the dead bolt via double shear. The first plate and/or third plate as well as the frame may be fitted flush with their respective mating surfaces to further reduce the vulnerability to unauthorized attack.

DETAILED DESCRIPTION OF THE PREFERRED EMBODIMENT

Figures 1, 2:
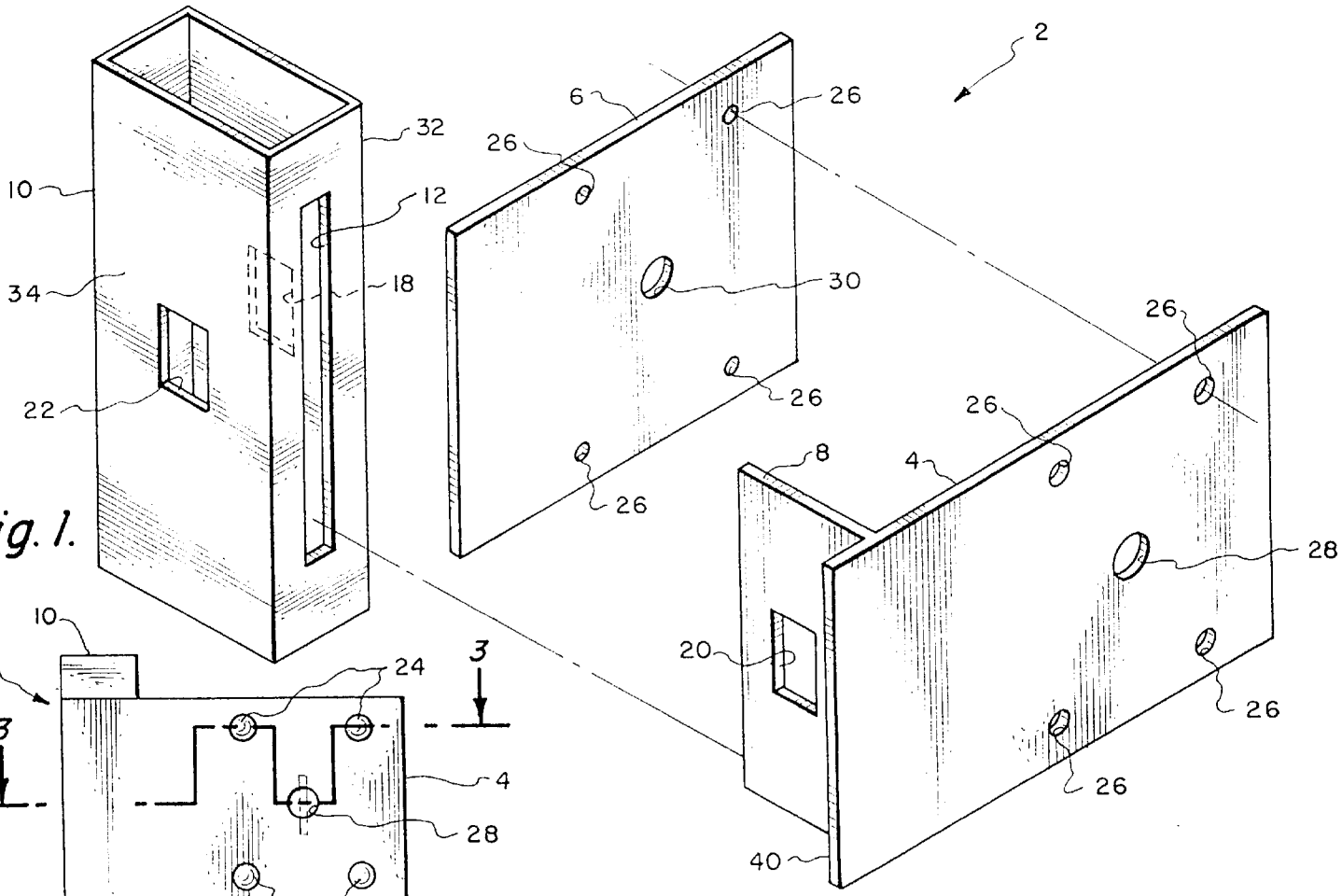
FIG. 1 is an exploded view of the preferred embodiment of a locking mechanism which constitutes the present invention.
FIG. 2 is top view of the locking mechanism of FIG. 1.
Figure 3:
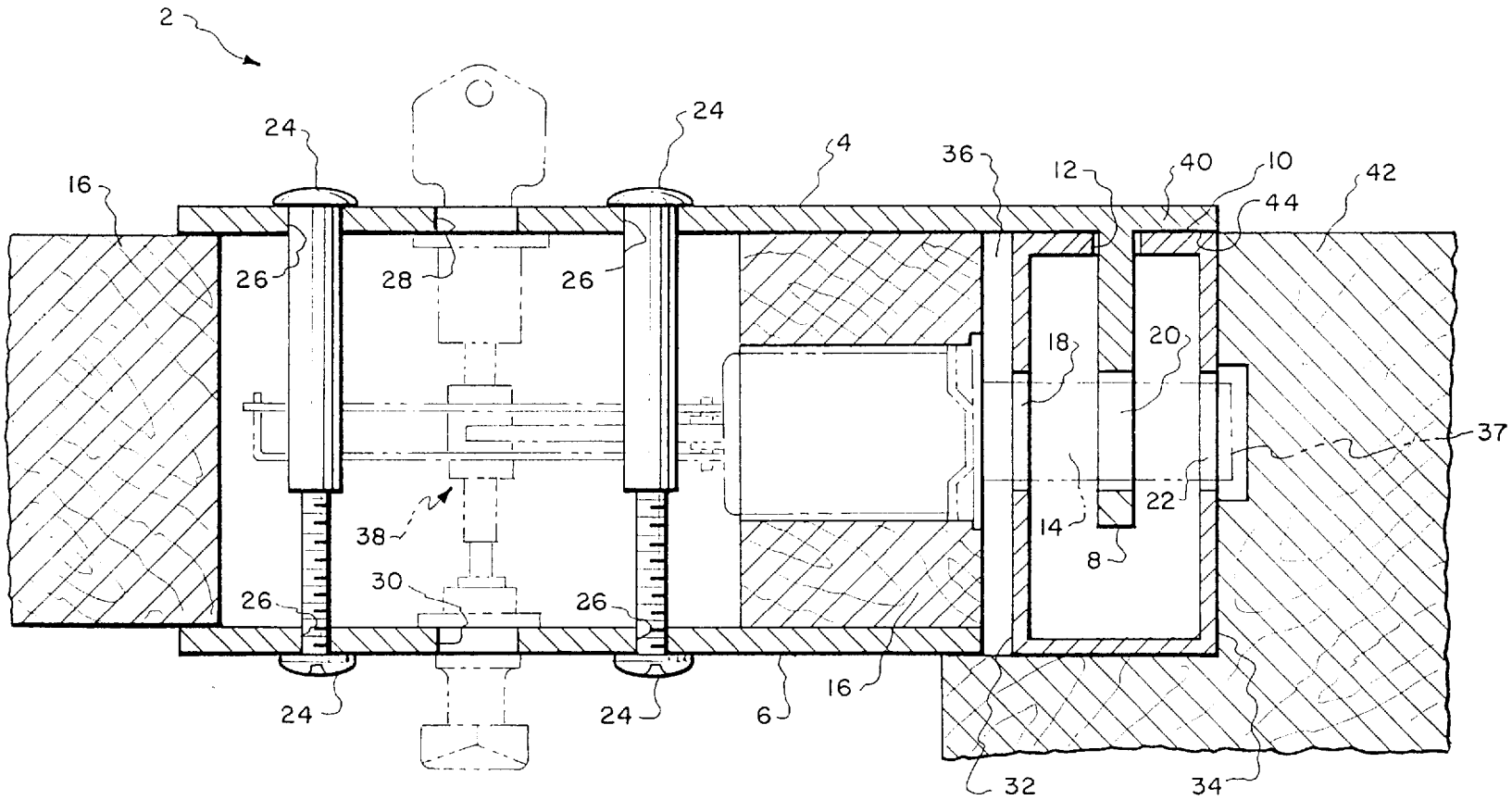
FIG. 3 is a sectional view taken along line 3—3 of FIG. 2 which illustrates the locking mechanism of FIG. 1 attached to a door and its associated door frame.
Figure 4:
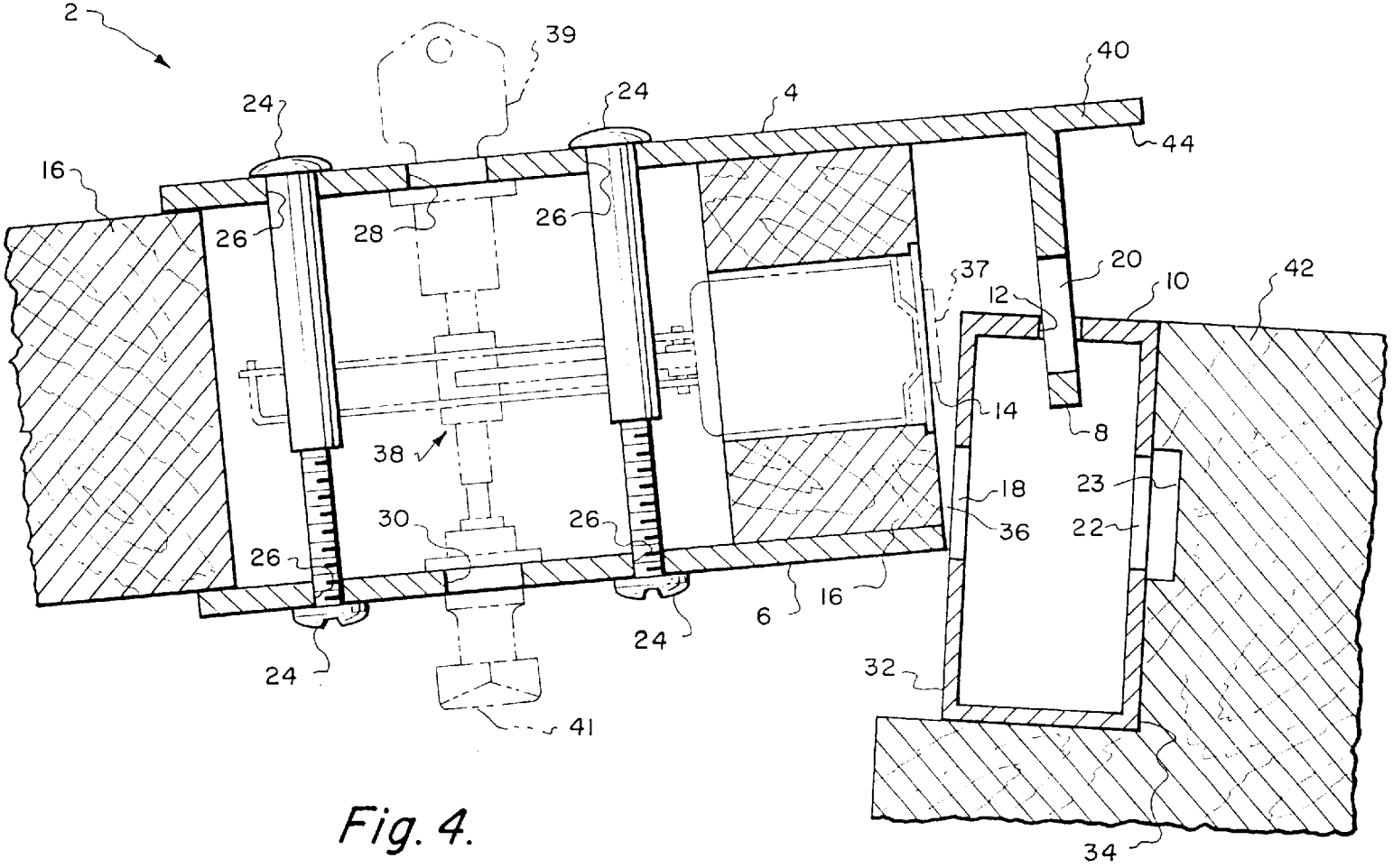
FIG. 4 is a sectional view of the locking mechanism of FIG. 1 just prior to closure of the door.

The preferred embodiment of the present invention is illustrated by way of example in FIGS. 1–4 of the drawings. As shown in FIG. 1 the integrated astragal, which is designated generally by the reference numeral 2, comprises a generally rectangular shaped plate 4, a generally rectangular shaped plate 6, a strike plate 8 and a steel frame or tube 10. Rectangular shaped plates 4 and 6 are affixed to a door 16, while steel tube 10 is affixed to the door's associated door frame 42. Strike plate 8 is attached as by of a weld (not illustrated) or other suitable means, to the inside surface of rectangular shaped plate 4 and extends from plate 4 at approximately a ninety degree angle. As is best illustrated in FIGS. 3 and 4, strike plate 8 is positioned so that when door 16 is closed, strike plate 8 aligns with an aperture 12 in steel tube 10 and extends inwardly into tube 10. As shown in FIG. 1, aperture 12 in tube 10 has a rectangular shape which approximates the edge of strike plate 8 allowing aperture 12 to receive strike plate 8 when door 16 is closed.

Steel tube or frame 10 also has an apertures 18 positioned within side 32 of tube 10 and an aperture 22 positioned within side 34 of tube 10. Apertures 18 and 22 are aligned with an aperture 20 within strike plate 8 when door 16 is in the closed position illustrated in FIG. 3. Door 16 may then be secured by activating a dead bolt 14 (illustrated in phantom) to slidably engage apertures 18 and 22 in steel tube 10 and aperture 20 in strike plate 8. When activated as shown in FIG. 3 and door 16 is in the closed position, dead bolt 14 is placed or put in a double shear condition by apertures 18 and 22. This double shear condition illustrated in FIG. 3 prevents dead bolt 14 from rotating out of door frame 42 when an attempt is made to pry door 16 from door frame 42.

Further, whenever the door 16 is closed and strike plate 8 has entered aperture 12 extending inwardly into steel tube 10 in the manner shown in FIG. 3, there is an interlock provided between door 16 and tube 10 which resist separation of door 16 from door frame 42.

It should be noted that in the preferred embodiment of the present invention as shown in FIG. 1, steel tube 10 is a rectangular shaped tube like structure and is fabricated from mild steel. For example, 3/16 or 1/4 inch steel may used to fabricate steel tube 10. In addition, plates 4 and 6 and strike plate 8 may be fabricated from 3/16 or 1/4 inch steel to insure adequate strength of these components of integrated astragal 2 against attempted break-ins.

Other shapes and materials may be used, as desired. Steel tube 10 may be attached to door frame 42 by means of a weld, screws, bolts or the like. If, for example, a weld covering side 34 of steel tube 10 is used to secure steel tube 10 to door frame 42, more than adequate strength is provided to prevent separation of steel tube 10 from door frame 42 during an attempted break-in by an intruder. If screws or bolts are used to secure steel tube 10 to door frame 42 then the screws or bolts must be placed in shear and of sufficient strength to prevent separation of tube 10 from door frame 42. Steel tube or frame 10 may also be formed as an integral component of door frame 42 during the fabrication of door frame 42.

Referring to FIGS. 3 and 4, rectangular shaped plate 4 and rectangular shaped plate 6 abut the outside surface and inside surface respectively of door 16. As shown in FIG. 1 each rectangular shaped plate 4 and 6 include four apertures 26. Each aperture 26 of plate 4 aligns with one of the four apertures 26 of plate 6. The aligned apertures 26 of plates 4 and 6 are then adapted to receive four sex bolts 24 which secure plate 4 and plate 6 to door 16 as is best illustrated in FIG. 3. Sex bolts are desirable since they are designed for a specific thickness of door thereby securing plates 4 and 6 to door 16 without crushing door 16.

There is also included within plate 4 and plate 6, respectively, a pair of aligned apertures 28 and 30 which provide access for key lock 39, door knob 41 (illustrated in phantom in FIG. 4) or any other suitable means for activating and/or locking dead bolt 14. In addition, combination locks, manually activated door handles or electronic locks may also be utilized for activating and/or locking dead bolt 14. When the preferred embodiment of the present invention is utilized and dead bolt 14 is in the locked position, it can be seen in FIG. 3 that the end portion 37 of dead bolt 14 extends through and beyond aperture 22 in steel tube 10 to an indent 23 (FIG. 4) within door 42. In this case, dead bolt 14 is supported by apertures 18, 20 and 22.

Rectangular shaped plate 4 has a portion thereof which extends beyond door 16 to form a latch guard (designated generally by the reference numeral 40). As can be seen from FIG. 3, plate 4 and plate 6 are flush with door 16 and its associated door frame 42 thereby providing an aesthetically attractive as well as a practical and inexpensive door, frame and lock system. Further, since the inner surface 44 of latch guard 40 is approximately flush with the door frame 42, it is very difficult for an intruder attempting a break-in, to insert a prying tool between the latch guard 40 of plate 4 and the door frame 42.

As shown in FIG. 3, rectangular shaped plate 4 prevents the entry of a pry bar, for example, into a gap 36 in the area where rectangular shaped plate 4 covers gap 36 whenever door 16 is closed. Plate 4 also prevents direct access by an intruder to locking mechanism 38 for dead bolt 14, dead bolt 14 or any other mechanism directly behind plate 4.

In most cases, such as retro-fitting, it is desirable and/or economical to retain and utilize the existing locking mechanism 38 and its dead bolt 14, key locks 39 and door knobs 41. The integrated astragal 2 of the present invention is easily adapted for use with most conventional and commercially available dead bolt locking systems in that the locking mechanism 38 and dead bolt 14 are positioned within integrated astragal 2 in the manner illustrated in FIGS. 3 and 4 without modification to the locking mechanism 38.

At this time it should be noted that integrated astragal 2 is designed to provide a minimum time period of one minute before an intruder can separate door 16 from its associated door frame 42 and gain access to the area behind door 16.

It can readily be appreciated that the integrated astragal 2 provides a very simple, relatively inexpensive and yet highly effective means for securing a door to its associated door frame which make use of existing dead bolt lock mechanisms. Obviously, many modifications and variations of the present invention are possible in light of the above teachings. It is therefore to be understood that within the scope of the appended claims, the invention may be practiced otherwise that as specifically described.

What is claimed is:

1. A door locking apparatus for attachment to a door having a dead bolt and a door frame for said door, said door locking apparatus comprising:

a first rectangular shaped plate adapted to attach to an outside face of said door;

a second rectangular shaped plate adapted to attach to an inside face of said door;

a strike plate attached to said first rectangular shaped plate at an angle of approximately ninety degrees;

a rectangular shaped tube adapted to attach to said door frame, said rectangular shaped tube having an elongated opening positioned in an end thereof, said strike plate extending through said elongated opening into an inner portion of said retangular shaped tube when said door is in a closed position;

said strike plate having an aperture adapted to align with said dead bolt when said door is in said closed position;

said rectangular shaped tube having a first aperture on one side thereof and a second aperture an opposite side thereof, the first and second apertures of said rectangular shaped tube being adapted to align with said dead bolt when said door is in said closed position to receive said dead bolt when said dead bolt is fully extended from said door through the aperture of said strike plate and the first and second apertures of said rectangular shaped tube.

2. The door locking apparatus of claim 1 wherein said rectangular shaped tube is fabricated from tubular steel having a 3/16 inch thickness.

3. The door locking apparatus of claim 1 wherein said strike plate and said first and second rectangular shaped plates are each fabricated from steel having a 3/16 inch thickness.

4. The door locking apparatus of claim 1 wherein said strike plate and said first and second rectangular shaped plates are each fabricated from steel having a ¼ inch thickness.

5. The door locking apparatus of claim 1 wherein said rectangular shaped tube is fabricated from tubular steel having a ¼ inch thickness.

6. The door locking apparatus of claim 1 wherein said first rectangular shaped plate has an aperture and said second rectangular shaped plates has an aperture, the aperture of said first rectangular shaped plate being aligned with the aperture of said second rectangular shaped plate, the aperture of said first rectangular shaped plate being adapted to receive a key lock and the aperture of said second rectangular shaped plate being adapted to receive a door knob.

7. The door locking apparatus of claim 1 wherein said first rectangular shaped plate has an aperture and said second rectangular shaped plates has an aperture, the aperture of said first rectangular shaped plate being aligned with the aperture of said second rectangular shaped plate, the aperture of said first rectangular shaped plate being adapted to receive a key lock and the aperture of said second rectangular shaped plate being adapted to receive a door knob.

8. A door locking apparatus for attachment to a door having a dead bolt and a door frame for said door, said door locking apparatus comprising:

a first rectangular shaped plate adapted to attach to an outside face of said door, said first rectangular shaped plate being adapted to be approximately flush with the outside face of said door;

a second rectangular shaped plate adapted to attach to an inside face of said door;

a strike plate attached to said first rectangular shape plate at an angle of approximately ninety degrees;

a rectangular shaped tube adapted to attach to said door frame, said rectangular shaped tube having an elongated opening positioned in an end thereof, said strike plate extending through said elongated opening into an inner portion of said rectangular shaped tube to resist a forced separation of said door from said door frame when said door is in a closed position;

said strike plate having an aperture adapted to align with said dead bolt when said door is in said closed position;

said rectangular shaped tube having a first aperture on one side thereof and a second aperture an opposite side thereof, the first and second apertures of said rectangular shaped tube being adapted to align with said dead bolt when said door is in said closed position to receive said dead bolt when said dead bolt is fully extended from said door through the aperture of said strike plate and the first and second apertures of said rectangular shaped tube, the first and second apertures of said rectangular shaped tube being adapted to place said dead bolt in a double shear condition which prevents said dead bolt from rotating out of said door frame when an attempt is made to pry said door from said door frame.

9. The door locking apparatus of claim 8 wherein said rectangular shaped tube is fabricated from tubular steel having a 3/16 inch thickness.

10. The door locking apparatus of claim 8 wherein said strike plate and said first and second rectangular shaped plates are each fabricated from steel having a 3/16 inch thickness.

11. The door locking apparatus of claim 8 wherein said strike plate and said first and second rectangular shaped plates are each fabricated from steel having a ¼ inch thickness.

12. The door locking apparatus of claim 8 wherein said rectangular shaped tube is fabricated from tubular steel having a ¼ inch thickness.

13. A door locking apparatus for attachment to a door having a dead bolt and a door frame for said door, said door locking apparatus comprising:

a first rectangular shaped plate adapted to attach to an outside face of said door, said first rectangular shaped plate being adapted to be approximately flush with the outside face of said door;

a second rectangular shaped plate adapted to attach to an inside face of said door;

a strike plate attached to said first rectangular shaped plate at an angle of approximately ninety degrees;

a rectangular shaped tube adapted to attach to said door frame, said rectangular shaped tube having an elongated opening positioned in an end thereof, said strike plate extending through said elongated opening into an inner portion of said rectangular shaped tube to resist a forced separation of said door from said door frame when said door is in a closed position; said strike plate having an aperture adapted to align with said dead bolt when said door is in said closed position;

said rectangular shaped tube having a first aperture on one side thereof and a second aperture an opposite side thereof, the first and second apertures of said rectangular shaped tube being adapted to align with said dead bolt when said door is in said closed position to receive said dead bolt when said dead bolt is fully extended from said door through the aperture of said strike plate and the first and second apertures of said rectangular shaped tube, the first and second apertures of said rectangular shaped tube adapted to place said dead bolt in a double shear condition which prevents said dead bolt from rotating out of said door frame when an attempt is made to pry said door from said door frame;

a plurality of bolts coupled to said first and second rectangular shaped plates, said plurality of bolts being adapted to attach said first and second rectangular shaped plates to said door;

said first rectangular shaped plate having an aperture and said second rectangular shaped plates having an aperture, the aperture of said first rectangular shaped plate being adapted to align with the aperture of said second rectangular shaped plate, the apertures of said first and second rectangular shaped plate being adapted to receive means to extend said dead bolt through the aperture of said strike plate and the first and second apertures of said rectangular shaped tube when said door is in said closed position.

14. The door locking apparatus of claim 13 wherein said rectangular shaped tube is fabricated from tubular steel having a 3/16 inch thickness.

15. The door locking apparatus of claim 13 wherein said strike plate and said first and second rectangular shaped plates are each fabricated from steel having a 3/16 inch thickness.

16. The door locking apparatus of claim 13 wherein said strike plate and said first and second rectangular shaped plates are each fabricated from steel having a ¼ inch thickness.

17. The door locking apparatus of claim 13 wherein said rectangular shaped tube is fabricated from tubular steel having a ¼ inch thickness.

* * * * *